United States Patent
Khan

(10) Patent No.: US 12,421,933 B1
(45) Date of Patent: *Sep. 23, 2025

(54) LOW SPEED MULTIBLADE WIND TURBINE

(71) Applicant: KING FAHD UNIVERSITY OF PETROLEUM AND MINERALS, Dhahran (SA)

(72) Inventor: Sikandar Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/939,611

(22) Filed: Nov. 7, 2024

Related U.S. Application Data

(63) Continuation of application No. 18/609,714, filed on Mar. 19, 2024, now Pat. No. 12,173,684.

(51) Int. Cl.
*F03D 1/06* (2006.01)

(52) U.S. Cl.
CPC .... *F03D 1/0641* (2013.01); *F05B 2240/2211* (2013.01); *F05B 2240/301* (2013.01)

(58) Field of Classification Search
CPC .... F03D 1/0641; F03D 1/0633; F03D 1/0675; F05B 2240/301
See application file for complete search history.

(56) References Cited

U.S. PATENT DOCUMENTS

| | | | |
|---|---|---|---|
| 8,241,000 B2 * | 8/2012 | Blanton | F03D 1/0641 416/223 R |
| 8,801,387 B2 | 8/2014 | Fukami | |
| 10,400,743 B1 * | 9/2019 | Kelley | F03D 1/0633 |
| 11,746,742 B1 * | 9/2023 | Ennis | F03D 13/25 416/204 R |

(Continued)

FOREIGN PATENT DOCUMENTS

| | | |
|---|---|---|
| CN | 209855955 U | 12/2019 |
| CN | 116157597 A | 5/2023 |
| CN | 106401866 B | 6/2023 |

OTHER PUBLICATIONS

Akbari et al. ; Multi-Objective Optimization of a Small Horizontal-Axis Wind Turbine Blade for Generating the Maximum Startup Torque at Low Wind Speeds ; MDPI machines, 10 ; Sep. 8, 2022 ; 21 Pages.

(Continued)

*Primary Examiner* — Justin D Seabe
(74) *Attorney, Agent, or Firm* — Oblon, McClelland, Maier & Neustadt, L.L.P.

(57) ABSTRACT

A wind turbine for a region with an average wind speed of less than 5 m/s includes a rotor comprising a rotor hub and multiple blades connected to the rotor hub. The rotor is configured for rotation with a starting torque and a torque-magnitude-profile-over-time. Each blade has multiple sections distributed between a blade root and a blade tip, and each section has a chord length and an angle of twist. The chord length is a first non-dimensional value from 0 to 1 and (Continued)

the angle of twist is specified in radian. The first and second non-dimensional values are convertible to dimensional values in meters by multiplying the first non-dimensional values by a maximum chord length.

12 Claims, 9 Drawing Sheets

(56) References Cited

U.S. PATENT DOCUMENTS

2010/0119374 A1* 5/2010 Wood .................... F03D 1/0633
416/223 R

OTHER PUBLICATIONS

Liu et al. ; Development and application of an improved blade element momentum method model on horizontal axis wind turbines ; International Journal of Energy and Environmental Engineering, 3:30 ; Jan. 2012 ; 11 Pages.

* cited by examiner

LOW SPEED MULTIBLADE WIND TURBINE

CROSS-REFERENCE TO RELATED APPLICATIONS

The present application is a Continuation of U.S. application Ser. No. 18/609,714, now allowed, having a filing date of Mar. 19, 2024.

STATEMENT OF PRIOR DISCLOSURE BY AN INVENTOR

Aspects of the present disclosure are described in Khan, S., A., Modeling Study Focused on Improving the Aerodynamic Performance of a Small Horizontal Axis Wind Turbine. *Sustainability* 2023, 15, 5506, incorporated herein by reference in its entirety.

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to a wind turbine, and more particularly, relates to a wind turbine for a region with an average wind speed of less than 5 m/s.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wind energy is one of the renewable sources most widely used in place of fossil fuels to mitigate global warming. A wind turbine converts the kinetic energy of the wind into mechanical energy which in turn is converted into electrical energy using a generator. Although wind turbine has some advantages, sudden variations in the magnitude and direction of the incoming wind are concerns. There are different types of wind turbines such as horizontal axis and vertical axis wind turbines based on direction of the axis of the wind turbine. Based on the wind speed, wind turbines can be classified as low-speed wind turbines, medium-speed wind turbines, and high-speed wind turbines. For regions with low-to-medium wind speeds, a large wind turbine may encounter a problem during the starting phase. The low wind speed is normally not enough to overcome the starting inertia of a large wind turbine. Normally, small wind turbine models are utilized in regions with low-to-medium wind speeds. According to the International Electrochemical Commission (IEC), a small wind turbine is one that has a rotor swept area of less than 200 m$^2$, and which corresponds to a rated power of 50 kW (See: *IEC 61400-2; Wind Turbines Part 2: Small Wind Turbines.* International Electrotechnical Commission: London, UK, 2013; *ISBN* 978-2-8322-1284-4, incorporated herein by reference). In the regions with low-to-medium wind speeds, normally, small wind turbine models are installed (See: Kelele, H. K; Frøyd, L.; Kahsay, M. B.; Nielsen, T. K. Characterization of aerodynamics of small wind turbine blade for enhanced performance and low cost of energy. *Energies* 2022, 15, 8111). During the starting phase of the wind turbine in low wind speed regions, the lift-to-drag ratio of the wind turbine blade is low and the blade angle is normally high, which restricts the starting of the wind turbine (See: Gitano-Briggs, H. Low speed wind turbine design. *Adv. Wind. Power, IntechOpen*, London, UK, 2012; *ISBN* 978-953-51-0863-4). A folding-blade design for the horizontal axis wind turbine has been proposed in order to improve the starting behavior of the wind turbine (See: Chu, Y. J.; Lam, H. F.; Peng, H. Y. Numerical investigation of the power and self-start performance of a folding-blade horizontal axis wind turbine with a downwind configuration. *Int. J. Green Energy* 2022, 19, 28-51). A modified vented NACA0012 aerofoil in an effort to increase the torque produced by a wind turbine at a low tip speed ratio (TSR) has been described (See: Mitchell, S.; Ogbonna, L; Konstantin, V. Improvement of self-starting capabilities of vertical axis wind turbines with new design of turbine blades. *Sustainability* 2021, 13, 3854. https://doi.org/10.3390/su13073854). A great amount of research is needed to provide wind turbine blade profiles that can achieve high starting torques and can start even at low wind speeds. An experimental and theoretical investigation of a micro wind turbine was carried out for improving the starting behavior of the wind turbine in low wind speed regions (See: Akour, S. N.; Al-Heymari, M.; Ahmed, T.; Khalil, K. A. Experimental and theoretical investigation of micro wind turbine for low wind speed regions. *Renew. Energy* 2018, 116, 215-223). The starting performance of a three-bladed, 2 m diameter horizontal axis wind turbine in field tests was investigated and compared it with a quasi-steady blade element analysis (See: Wright, A. K; Wood, D. H. The starting and low wind speed behavior of a small horizontal axis wind turbine. *J. Wind. Eng. Ind. Aerodyn.* 2000, 92, 1265-1279). A quasi-steady analysis was used for improving the starting behavior of the wind turbine that is operated at high angles of attack and a low Reynolds number (See: Ebert, P. R.; Wood, D. H. Observations of the starting behavior of a small horizontal axis wind turbine. *Renew. Energy* 1997, 12, 245-257).

An analogy between the aerofoil in the Darrieus motion and flapping-wing flow mechanisms was proposed (See: Supakit, W.; Grant, L. I.; Robert, G. D. The physics of H-Darrieus turbine starting behavior. *J. Eng. Gas Turbines Power* 2016, 138, 1-11). Based on this analogy, the unsteadiness could be exploited for generating additional thrust, and the rotor geometry is the main source of this unsteady thrust. For self-starting, it is necessary that the rotors exploit this unsteadiness. It was concluded that self-starting rotors may be designed through an appropriate selection of blade aspect and chord-to-diameter ratios. The effect of offsetting pitching angles and blade numbers on the power extraction performance and self-starting characteristics of the vertical axis wind turbine (VAWT) was investigated (See: Sun, X.; Zhu, J.; Li, Z.; Sun, G. Rotation improvement of vertical axis wind turbine by offsetting pitching angles and changing blade numbers. *Energy* 2021, 215, 119177). Due to the fact that the vortex separation could be suppressed or delayed due to offsetting the pitching angle and blade number, the starting performance of the wind turbine will be improved. The aerodynamics of Darrieus turbines during start-up using a two-dimensional CFD approach was investigated (See: Mohamed, O. S.; Elbaz, A. M.; Bianchini, A. A better insight on physics involved in the self-starting of a straight-blade Darrieus wind turbine by means of two-dimensional Computational Fluid Dynamics. *J. Wind. Eng. Ind. Aerodyn.*

2021, 218, 104793). The ANSYS-FLUENT solver was utilized to perform the fluid-structure interaction simulation. The results showed that the blade local absolute velocity (V∞, L) is dependent on the instantaneous tip speed ratio during the starting revolutions of the rotor.

For locations with low-to-medium wind speeds (less than 7 m/s), the starting of the wind turbine is a challenge. To start a stationary wind turbine, it necessary to overcome the inertia and static friction of the turbine, and the angle of incidence of the wind relative to the blade profile also needs to be favorable. Thus, at low wind speeds, the resulting low torque is not enough to start the wind turbine. Therefore, there is a need remains to develop a wind turbine that can start in a region with low-to-medium wind speeds.

Each of the aforementioned references suffers from one or more drawbacks hindering their adoption. Accordingly, it is one object of the present disclosure to provide a wind turbine that can operate in a region with an average wind speed of less than 5 m/s.

SUMMARY

In an exemplary embodiment, a wind turbine for a region with an average wind speed of less than 5 m/s is described. The wind turbine includes a rotor having a rotor hub and a plurality of blades. The rotor has a rotor diameter and is configured for rotation with a starting torque and a torque-magnitude-profile-over-time. Each blade of the plurality of blades is connected to the rotor hub and extends radially about the rotor hub. Further, tach blade has a blade root and a blade tip. Each blade of the plurality of blades also has a plurality of sections distributed longitudinally between the blade root and the blade tip, and each section of the plurality of sections has a chord length and an angle of twist set forth in Table 5.

The chord length is a first non-dimensional value from 0 to 1 and the angle of twist is specified in radian. The first non-dimensional value is convertible to a dimensional value in meters by multiplying the first non-dimensional value of the chord length by a maximum chord length.

In some embodiments, the rotor diameter is about 5 meters.

In some embodiments, the region with the average wind speed of less than 5 m/s has the average wind speed of about 3.56 m/s.

In some embodiments, the starting torque is greater than 25 N-m.

In some embodiments, the torque-magnitude-profile-over-time includes a slope, and the slope logarithmically increases over time during a first 10 seconds of rotation.

In some embodiments, the wind turbine is a Small Horizontal Axis Wind turbine in accordance with International Electrotechnical Commission.

In some embodiments, the plurality of blades includes three (3) blades.

In another exemplary embodiment, a wind turbine for a region with an average wind speed of less than 5 m/s is described. The wind turbine includes a rotor having a rotor hub and a plurality of blades. The rotor has a rotor diameter and is configured for rotation with a starting torque and a torque-magnitude-profile-over-time. Each blade of the plurality of blades is connected to the rotor hub and extends radially about the rotor hub. Further, each blade has a blade root and a blade tip. Each blade of the plurality of blades also has a plurality of sections distributed longitudinally between the blade root and the blade tip, and each section of the plurality of sections has a chord length and a blade angle set forth in Table 6.

The chord length is a first non-dimensional value from 0 to 1 and the angle of twist is specified in radian. The first non-dimensional value is convertible to a dimensional value in meters by multiplying the first non-dimensional value of the chord length by a maximum chord length.

In some embodiments, the rotor diameter is about 5 meters.

In some embodiments, the region with the average wind speed of less than 5 m/s has the average wind speed of about 3.56 m/s.

In some embodiments, the starting torque is greater than 25 N-m.

In some embodiments, the torque-magnitude-profile-over-time includes a slope, and the slope logarithmically increases over time during a first 10 seconds of rotation.

In some embodiments, the wind turbine is a Small Horizontal Axis Wind turbine in accordance with International Electrotechnical Commission.

In some embodiments, the plurality of blades includes three (3) blades.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
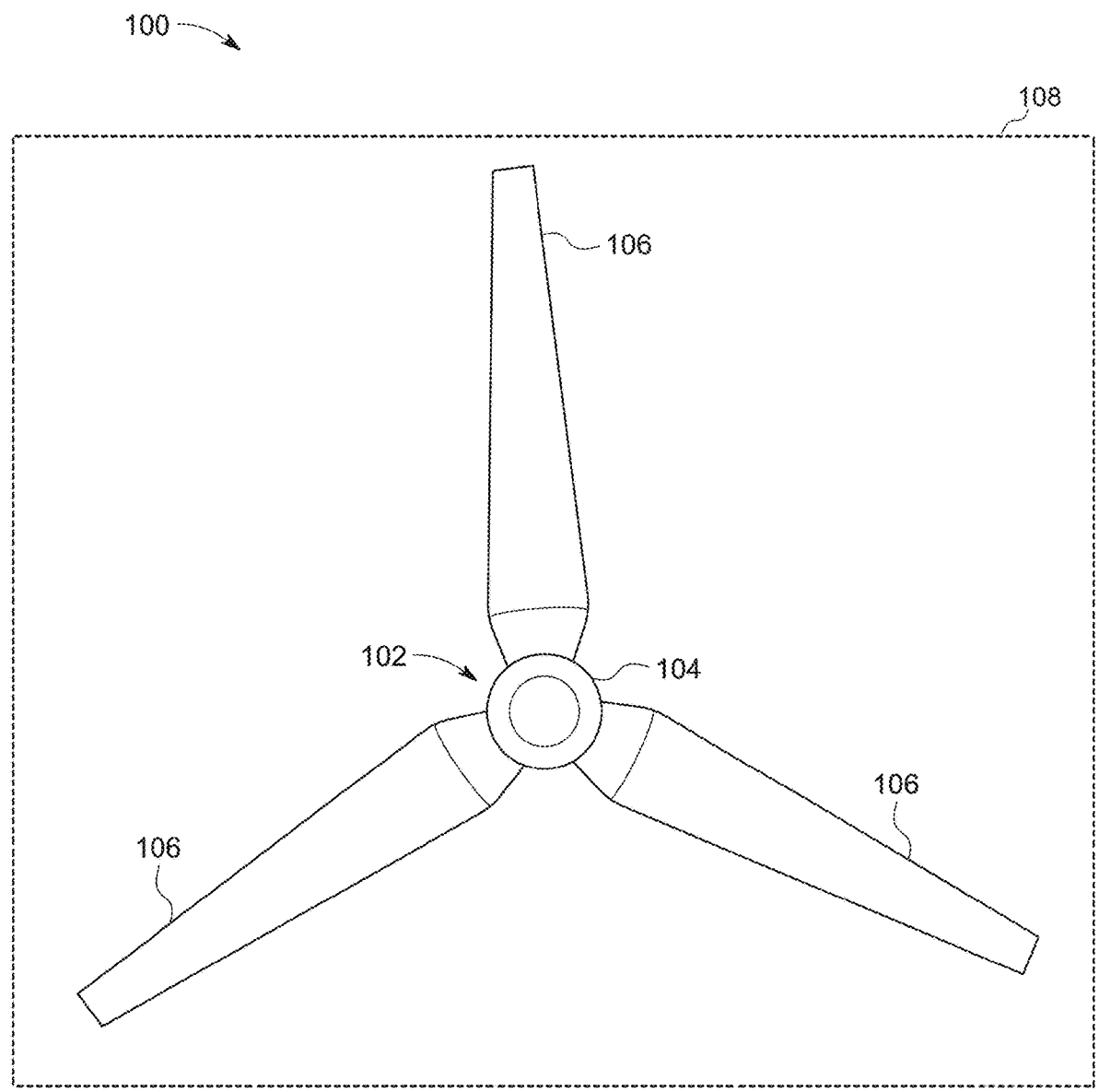
FIG. 1 is a schematic diagram of a wind turbine designed for a region with an average wind speed of less than 5 m/s, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a wind turbine for a region with an average wind speed of less than 5 m/s. In particular, the present disclosure relates to improving starting behavior of a horizontal axis wind turbine. Further, a design process is implemented in which the effects of changing wind turbine blade parameters, such as Chord length and Angle of twist near a rotor hub of the wind turbine, on the starting torque of the wind turbine are evaluated. The wind turbine blade parameters were calculated near the rotor hub of the wind turbine. The blade element momentum (BEM) theory is used to calculate wind turbine blade parameters that correspond to a maximum starting torque. A design model of the blade developed in Pro/E, based on the blade parameters, was simulated in ADAMS to find an output torque. Coefficient of performance (COP) and the output torque were calculated for various designs in order to obtain a wind turbine model for the region considered in the present disclosure.

Referring to FIG. 1, a schematic diagram of a design model of a wind turbine 100 is illustrated, according to certain embodiments. According to the present disclosure, the wind turbine 100 is designed for implementing in a region with an average wind speed of less than 5 m/s. Typically, a wind turbine is used to generate electricity from wind. In particular, a wind turbine transforms the kinetic energy of the wind into a mechanical power which in turn is converted into electricity using a generator. The wind turbine 100 includes a rotor 102 having a rotor hub 104 and a plurality of blades 106 connected to the rotor hub 104 on a rotor plane 108. According to the present disclosure, the plurality of blades 106 preferably includes three (3) blades. In some embodiments, the wind turbine 100 may include two or more blades 106. Each blade of the plurality of blades 106 is connected to the rotor hub 104 and extends radially about the rotor hub 104. The kinetic energy of the wind, or the wind energy, is turned into electricity using the aerodynamic forces from the plurality of blades 106. When wind flows across the blade 106, air pressure on one side of the blade 106 decreases, which causes difference in air pressure across the two sides of the blade 106. Such difference in air pressure creates both lift and drag. As the force of the lift is stronger than that of the drag, the rotor hub 104 rotates. The rotor hub 104 is connected to a generator through a shaft and a series of gears to generate electricity. In an embodiment of the present disclosure, the wind turbine 100 is a small horizontal axis wind turbine in accordance with International Electrotechnical Commission (IEC).

Figure 2:
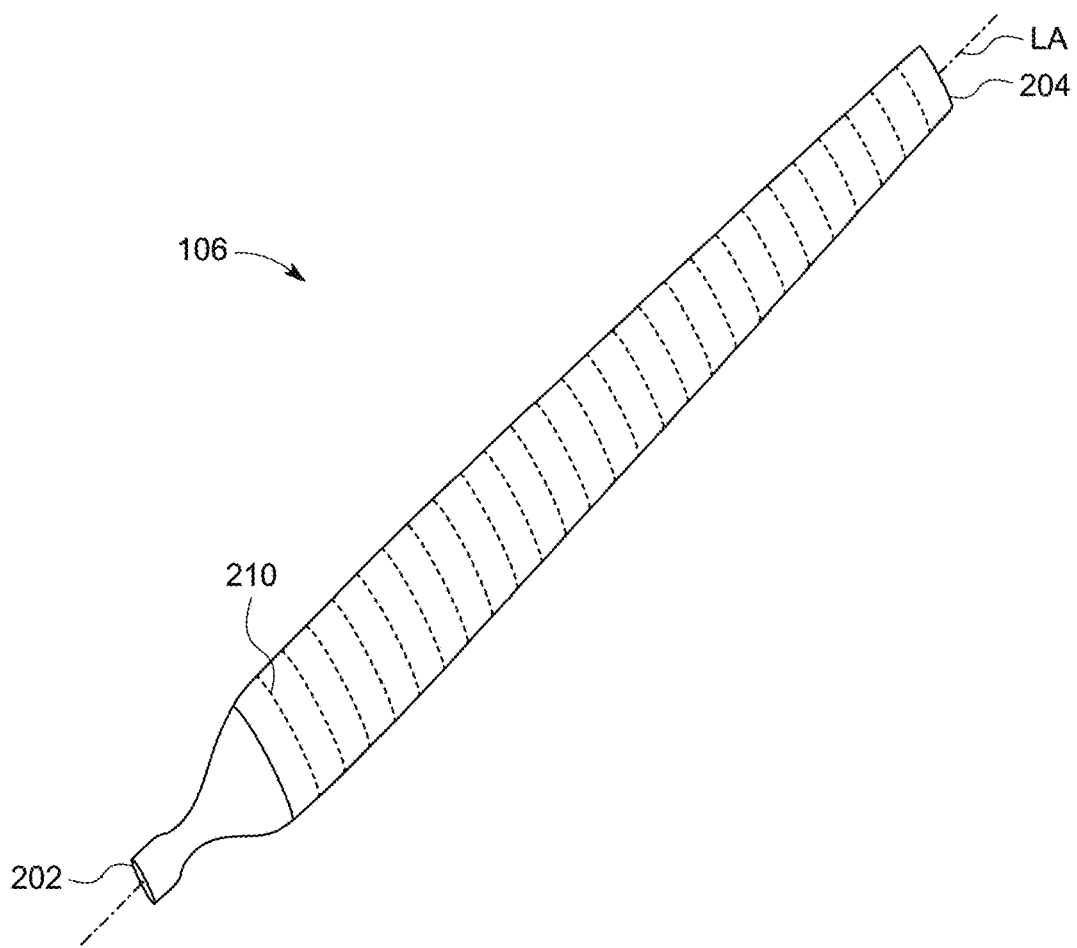
FIG. 2 is a schematic perspective view of a blade of the wind turbine, according to certain embodiments.

Referring to FIG. 2, a schematic perspective view of one of the plurality of blades 106 is illustrated, according to certain embodiments. The blade 106 includes a blade root 202 configured to connect to the rotor hub 104 and a blade tip 204. In an embodiment, the blade root 202 is configured to detachably connect to the rotor hub 104 using fastening members such as bolts and nuts. The blade root 202 may be otherwise referred to as a proximal end of the blade 106 and the blade tip 204 may be otherwise referred to as a distal end of the blade 106, as such the proximal and the distal ends of the blade 106 define a length thereof. The rotor 102 has a rotor diameter, which, according to the present disclosure, is 5 meters (m).

The blade 106 further includes a plurality of sections 210 distributed longitudinally between the blade root 202 and the blade tip 204. In particular, each section 210 may be defined as a cross-section of the blade 106 taken along a plane defined perpendicular to a longitudinal axis 'LA' of the blade 106. In one embodiment of the present disclosure, twenty-seven (27) sections 210 are defined along the length of the blade 106 between the blade root 202 and the blade tip 204. In one embodiment, each section of the plurality of sections 210 may be equidistant from the adjacent sections. In another embodiment, each section of the plurality of sections 210 may be defined at varying distance from the adjacent sections as desired for the simulation and analysis of the design model of the blade 106.

Figure 3:
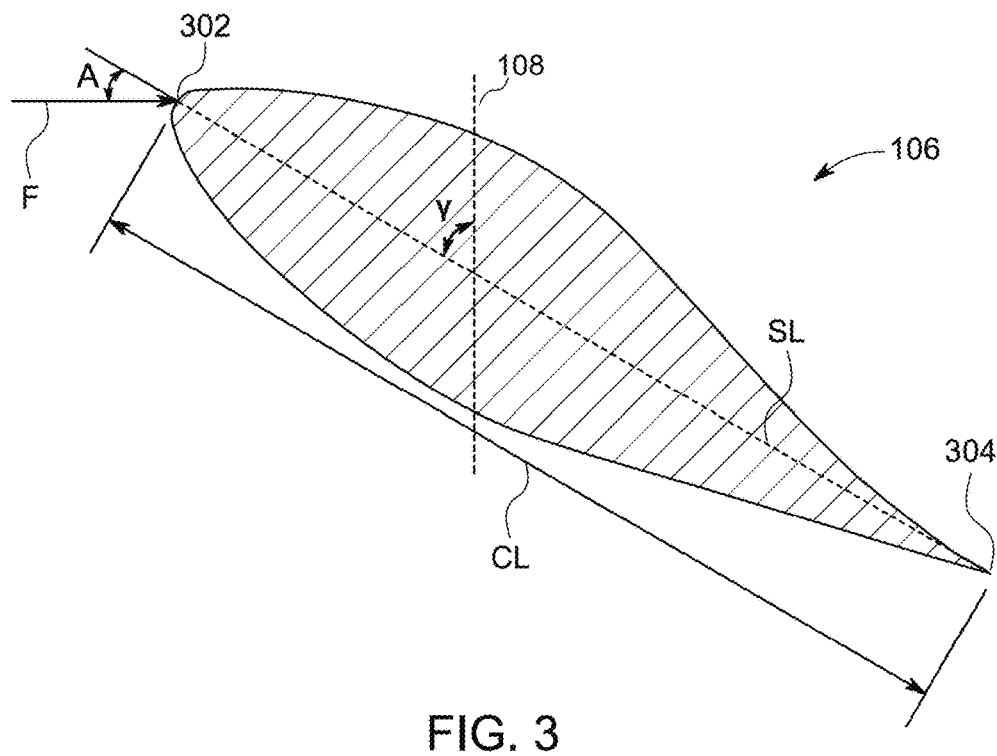
FIG. 3 is a schematic and enlarged cross-sectional view of the blade of FIG. 2 taken at one section thereof, according to certain embodiments.

Referring to FIG. 3, a schematic enlarged and cross-sectional view of the blade 106 of FIG. 2 is illustrated, according to certain embodiments. In particular, the cross-sectional view is taken along one section of the plurality of sections 210 as shown in FIG. 2. The blade 106 includes a leading edge 302 and a trailing edge 304 defining a length 'CL' along a width thereof. In other words, the length 'CL' is defined along a straight line 'SL', otherwise known as the chord line 'SL', connecting the leading edge 302 and the trailing edge 304 of the blade 106. Also, the blade 106 has a thickness progressively decreasing from the leading edge 302 to the trailing edge 304 along the width of the blade 106. The length 'CL' defined by the leading edge 302 and the trailing edge 304 is alternatively referred to as the chord length 'CL' or the chord width. The blade 106 has a blade angle 'A' defined between the chord line 'SL' and a direction of wind 'F'. The blade 106 has an angle of twist 'γ' defined between the chord line 'SL' and the rotor plane 108. The significance of the blade parameters such as the chord length 'CL', the angle of twist 'γ', and the blade angle 'A' for the present disclosure is described in detail herein below.

Referring to FIG. 2 and FIG. 3, each section of the plurality of sections 210 has a chord length 'CL' and the angle of twist 'γ'. In one embodiment of the present disclosure, each section of the twenty-seven sections 210 includes a first set of Chord length 'CL' and angle of twist 'γ'. The first set of the Chord length 'CL' and the angle of twist 'γ' is set forth in Table 5.

As shown in Table 5, the chord length 'CL' is a set of first non-dimensional values from 0 to 1 and the angle of twist 'γ' is specified in radian. The first non-dimensional value may be defined as numbers of the Chord length 'CL' of the blade 106 that are not measured on a scale of physical units such as meters. In an embodiment, the first non-dimensional value is convertible to a dimensional value in meters by multiplying the first non-dimensional value of the Chord length 'CL' by a maximum chord length. In some embodiments, the maximum chord length is between 0.5 m and 2.5 m. In another embodiments, the maximum chord length is about 1.1 m.

In another embodiment of the present disclosure, each section of the twenty-seven sections 210 includes a second set of Chord length 'CL' and angle of twist 'γ'. The second set of the Chord length 'CL' and the angle of twist 'γ' is set forth in Table 6.

As shown in Table 6, the chord length 'CL' is a first set of non-dimensional values from 0 to 1 and the angle of twist 'γ' is specified in radian. In an embodiment, the first non-dimensional value is convertible to a dimensional value in meters by multiplying the first non-dimensional values of the Chord length 'CL' by the maximum chord length. In some embodiments, the maximum chord length is between 0.5 m and 2.5 m. In another embodiments, the maximum chord length is about 1.1 m.

Figure 4A:
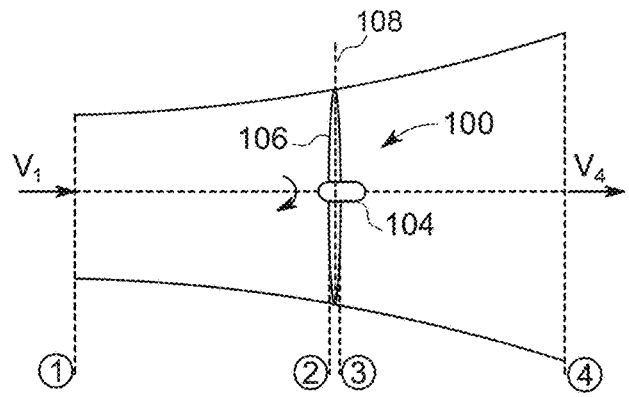
FIG. 4A is a schematic diagram illustrating a stream tube for axial forces on the wind turbine, according to certain embodiments.

According to the present disclosure, the blade element momentum (BEM) theory (See: Wind Turbine Blade Analysis Using the Blade Element Momentum Method. Available online: https://community.dur.ac.uk/g.l.ingram/download/wind_turbine_design.pdf (accessed on 10 Jan. 2023), incorporated herein by reference) is used for the analysis of an existing wind turbine and for designing a profile of the blade 106 for a specific wind speed. Using the BEM theory, the axial force and torque can be calculated by considering momentum balance at various locations. Referring to FIG. 4A, a stream tube is shown around the wind turbine 100 with four locations defined along a length of the stream tube. The location 1 is defined at upstream of the wind turbine 100, location 2 is defined just before the blades 106 of the wind turbine 100, location 3 is defined just after the blades 106 of the wind turbine 100, and location 4 is defined at downstream of the wind turbine 100. Between locations 2 and 3, energy is extracted from the wind so there is a change in pressure. If the pressure at location 1 is equal to the pressure at location 4, the velocity at the location 2 is equal to the velocity at the location 3, and the flow between the locations 1 and 2 and the locations 3 and 4 is frictionless, then by Bernoulli's equation:

$$P_2 - P_3 = \frac{1}{2}\rho(V_1^2 - V_4^2) \quad (1)$$

where $P_2$=pressure at the location 2, $P_3$=pressure at the location 3, $V_1$=upstream wind velocity, $V_4$=downstream wind velocity, and ρ is the density of air.

The axial force ($dF_x$) can be found by multiplying pressure with area (dA) as follows $$dF_x = (P_2 - P_3)dA \quad (2)$$

Putting the value of pressure difference from equation (1) into equation (2) will give $$dF_x = \frac{1}{2}\rho(V_1^2 - V_4^2)dA \quad (3)$$

The axial induction factor accounts for the loss in absolute velocity (V) when the incoming wind comes in contact with the blades 106 of the wind turbine 100. The axial induction factor (a) is given as $$a = \frac{V_1 - V_2}{V_1} \quad (4)$$

After some calculation, the following two equations are obtained $$V_2 = V_1(1-a) \quad (5)$$

$$V_4 = V_1(1-2a) \quad (6)$$

Putting the values of $V_2$ and $V_4$ in equation (3) will give the following equation $$dF_x = \frac{1}{2}\rho V_1^2 [4a(1-a)2\pi r dr] \quad (7)$$

Figure 4B:
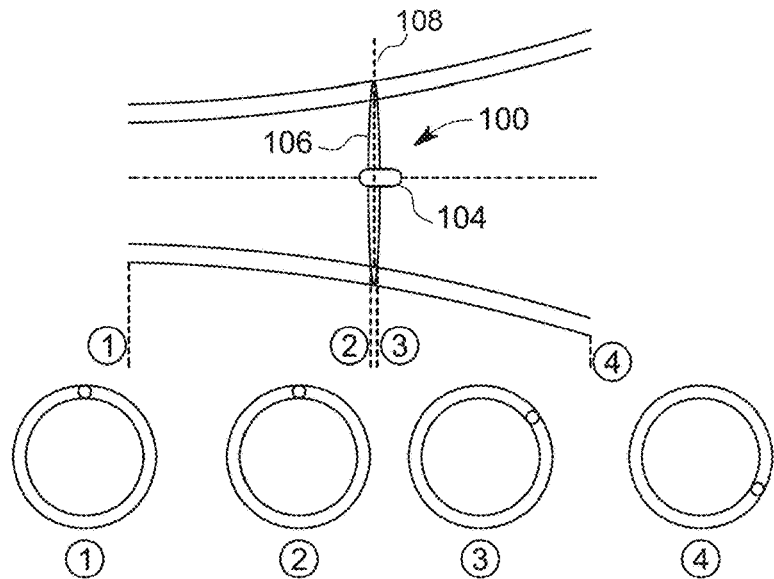
FIG. 4B is a schematic diagram illustrating a stream tube for tangential forces on the wind turbine, according to certain embodiments.
Figure 4C:
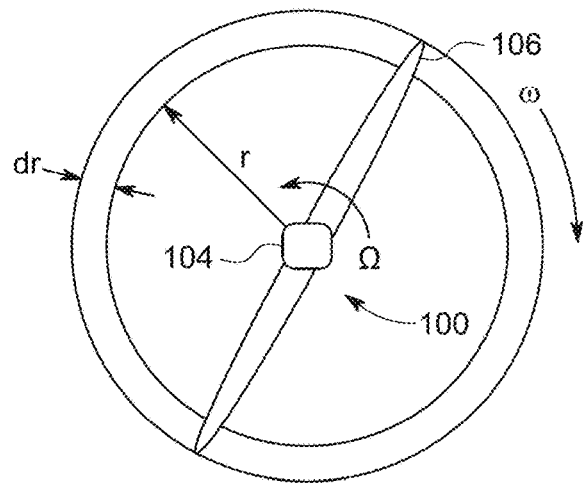
FIG. 4C is a schematic diagram illustrating angular velocities of the blade and blade wake, according to certain embodiments.

In order to derive an expression for the torque, a rotating annular stream tube is considered, as shown in FIG. 4B. Four locations are defined along a length of the rotating annular stream tube. The location 1 is defined at upstream of the wind turbine 100, the location 2 is defined just before the blades 106 of the wind turbine 100, the location 3 is defined just after the blades 106 of the wind turbine 100, and the location 4 is defined at downstream of the wind turbine 100. In order to derive an equation for the torque, the conservation of angular momentum is considered. The angular velocity of blade wake (ω) and the angular velocity of blade (Ω) are shown in FIG. 4C.

From the elementary knowledge of physics, moment of inertia of annulus, $I=mr^2$, angular moment, $L=I\omega$, and torque $T=dL/dt$, so $$T = \frac{dI\omega}{dt} = \frac{d(mr^2\omega)}{dt} = \frac{dm}{dt}r^2\omega \quad (8)$$

The torque for the small element can also be written as $$dT = d\dot{m}r^2\omega \quad (9)$$

From the continuity equation, we can put value of dṁ as $$d\dot{m} = \rho A V_2 \quad (10)$$

$$d\dot{m} = \rho 2\pi r dr V_2 \quad (11)$$

$$dT = \rho 2\pi r dr V_2 r^2 \omega \quad (12)$$

The angular induction factor accounts for the decrease in torque due to the wake effect. The angular induction factor is given as $$a' = \frac{\omega}{2\Omega} \quad (13)$$

As $V_2 = V_1(1-a)$, then $$dT = 4a'(1-a)\rho V \Omega r^3 \pi dr \quad (14)$$

The BEM theory gives two equations, one is for the axial force and the other for the torque. The power produced at any radius of the rotor 102 is a product of blade angular velocity and torque at that radius, as given below $$dP = \Omega dT \quad (15)$$

The total power is given as $$P = \int_{rh}^{R} dPdr = \int_{rh}^{R} \Omega T dr \qquad (16)$$

where, $r_h$ is the a radius of the rotor hub 104. The coefficient of performance (COP) shows the amount of kinetic energy extracted by the wind turbine 100 from the incoming wind and is given as $$COP = \frac{P}{P_{wind}} = \frac{\int_{rh}^{R} \Omega T dr}{\frac{1}{2}\rho\pi R^2 V^3} \qquad (17)$$

The coefficient of performance is also given as $$COP = \frac{8}{\lambda^2} \int_{\lambda_H}^{\lambda} Q\lambda_r^2 a'(1-a)\left[1 - \frac{C_D}{C_L}\tan\beta\right]d\lambda_r \qquad (18)$$

$\lambda_H$ is the tip speed ratio at the hub, $\lambda$ is the tip speed ratio, Q takes into account the tip losses, $\lambda_r$ is the tip speed ratio at a radius r from the rotor hub 104, $C_L$ is the coefficient of lift, $C_D$ is the coefficient of drag and p is the relative flow angle onto the blade 106.

Using equations (17) and (18), the actual power generated by the wind turbine 100 is given as $$\text{Power} = P = COP\eta\frac{1}{2}\rho\pi R^2 V^3 \qquad (19)$$

where η represents the expected electrical and mechanical efficiencies.

Figure 5:
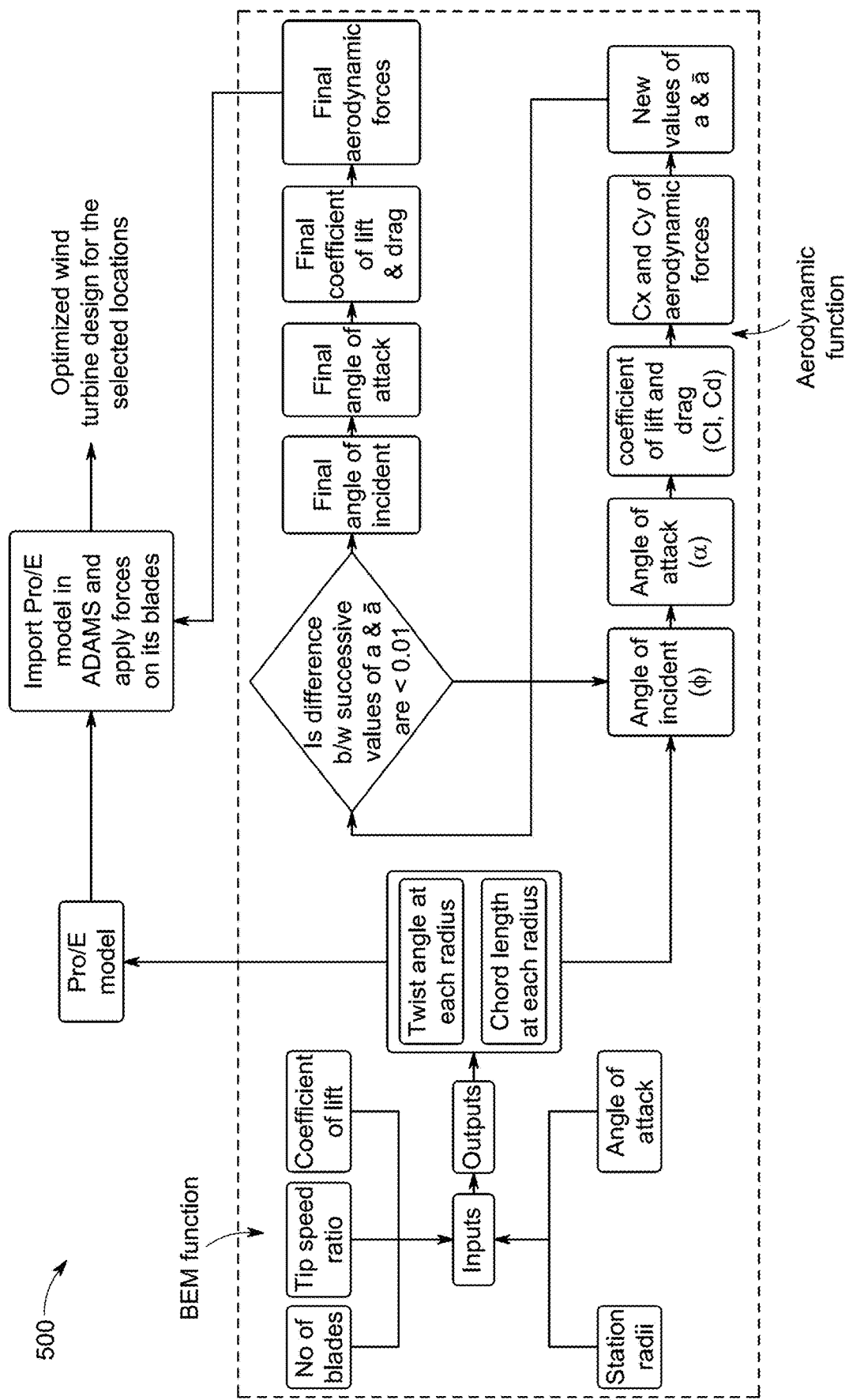
FIG. 5 is a schematic block diagram of a method used for designing the blade, according to certain embodiments.

Referring to FIG. 5, a schematic block diagram of a method 500 used for designing the blade 106 is illustrated, according to an embodiment of the present disclosure. Based on the above mentioned governing equations, a MATLAB function named 'BEM function' was developed, which takes the number of blades 106, tip speed ratio, coefficient of lift, stations radii and angle of twist as inputs. The station radii may be defined as radius of the wind turbine 100 defined at each section of the plurality of sections 210. These initial input values were selected based on studies performed for designing wind turbines for low-to-medium wind speeds locations (See: Akour, S. N.; Al-Heymari, M.; Ahmed, T.; Khalil, K. A. Experimental and theoretical investigation of micro wind turbine for low wind speed regions. *Renew. Energy* 2018, 116, 215-223; Wright, A. K; Wood, D. H. The starting and low wind speed behavior of a small horizontal axis wind turbine. *J. Wind. Eng. Ind. Aerodyn.* 2000, 92, 1265-1279; and Ebert, P. R.; Wood, D. H. Observations of the starting behavior of a small horizontal axis wind turbine. *Renew. Energy* 1997, 12, 245-257). The BEM function gives the blade parameters for the selected region, or location. The blade parameters include chord length and the angle of twist, or twist angle, distributions. The number of stations, or the sections 210, can be increased, which will provide more refined chord length and angle of twist distributions. The chord length and angle of twist distributions are inputs for generating a profile of the blade 106 of the wind turbine 100. After having these parameters, three dimensional (3D) models of the wind turbine 100 were developed using software application such as Pro/E. For developing the models of the wind turbine 100 in Pro/E, the blade 106 of the wind turbine 100 was divided into various sections 210, as shown in FIG. 2. Based on the chord length and the angle of twist at each section 210, the two dimensional (2D) cross-sectional profile, as shown in FIG. 3, is sketched at each section. Using the blend option in the Pro/E software, these two-dimensional sketches were combined in the shape of the three dimensional blade 106, as shown in FIG. 2. The three-dimensional blades 106 of the wind turbine 100 and the rotor hub 104 are assembled in Pro/E and were then imported into ADAMS, a software application used for the analysis of the wind turbine 100. In order to check the output torque of the wind turbine models, aerodynamic forces were applied on the blades 106 of the wind turbine 100.

A MATLAB function named "Aerodynamic function" was developed and used to calculate the wind forces that were applied on Pro/E models in the ADAMS environment. The aerodynamic function takes the blade parameters as input, and forces at various points on the blade 106 are given at the output. During the first stage, the aerodynamic function carried out an iteration process to find the values of axial and angular induction factors. The axial and angular induction factors are the key terms for finding the energy capture of a specific wind turbine design, working at a specific wind speed. Once the values of axial and angular induction factors are determined, the equations for the forces are used to find the aerodynamic forces. For the region considered in the present disclosure, the blade 106 of the wind turbine 100 was divided into twenty-seven sections 210. The blade parameters were changed near the rotor hub 104 of the wind turbine 100 (in the 9 sections near the rotor hub 104 of the wind turbine 100), and new models were developed in Pro/E.

All the models were simulated in ADAMS to find the output torque corresponding to all the models. ADAMS has a full graphical user interface to model the entire mechanical assembly in a single window. The graphical computer-aided design tools in ADAMS can be used to insert a model of a mechanical system in a three-dimensional space or import geometry files such as STEP or IGS. The motion of any two bodies can be constrained in ADAMS by adding a joint between them. Multiple inputs, such as velocities, forces, and initial conditions, can be added to the model in the ADAMS. The behavior of the system can be simulated over time in ADAMS, and it can also animate its motion and compute properties, such as accelerations, forces, torques, etc. ADAMS can be used to analyze extremely complex wind turbine dynamics models. The main advantage of calculating the torque curves using the ADAMS software is that the moment of inertia of the wind turbine 100 is considered during the modeling process. The modeling in ADAMS can be performed with the steps—exporting Pro/E models with IGS format, importing the IGS files into ADAMS, applying forces on the given models, carrying out simulation settings, and obtaining graphs in the ADAMS post-processor.

The various simulation parameters are simulation time, simulation steps, run-time direction of forces, construction of forces, characteristics of forces and magnitude of forces at various points. The number of steps shows the number of points at which the output parameters will be measured in a complete 360-degree rotation of the blades 106 of the wind turbine 100. Increasing the number of steps in one complete rotation of the blades 106 increases the accuracy of output simulations. The run-time direction of force may be space-fixed or body-moving. The body-moving option was considered for the aerodynamic forces of the present disclosure, because, at the wind turbine 100, there is a rotation pattern of wind regarding the blades 106. After assembling the wind turbine model in Pro/E, the model is imported into ADAMS, wind forces are applied on the model at various sections and the various outputs are plotted in the ADAMS post-processor. Finally, the models that have a higher starting torque were selected for the region with the average wind speed of less than 5 m/s. In an embodiment of the present disclosure, the region with the average wind speed of less than 5 m/s has the average wind speed of about 3.56 m/s. Further, the rotor 102 is configured for rotation with the starting torque and a torque-magnitude-profile-over-time, which will be explained in detail with reference to FIGS. 7A-7E. In an embodiment, the starting torque is greater than 25 N-m.

In an example, for the illustration purpose of the present disclosure, among various regions, the Cherat region with an average wind speed of 4.2 m/s was selected. In Khyber Pakhtunkhwa (KPK), the Pakistan Meteorological Department (PMD) monitors the wind speed at various locations (See: Pakistan Meteorological Department, Wind Energy Project. Available online: http://www.pmd.gov.pk/wind/wind_project_files/Page35l.html (accessed on 10 Jan. 2023)). Based on the wind speed monitored by the PMD for the Cherat region, there will be large impacts of seasonal variations on the working of wind turbines across the year due to the variation in the magnitude of the wind speed. The average wind speed for the Cherat region is 3.56 m/s for the months starting from June until October. This low magnitude of wind speed causes a reduction in the amount of electricity generated by the wind turbine. The rotor diameter selected for the Cherat region is 5 m, according to the present disclosure.

According to the present disclosure, before starting the modelling process of the rotor 102 of the wind turbine 100 for the selected Cherat location, a validation study was performed. For the validation of the simulation results, the output torque of the simulation is compared with the experimental results. The experimental study was performed for finding the aerodynamics properties of a blade profile made from wood. The wood model was exposed to the incident wind of various speeds. The speed of the incident wind was measured by an anemometer and the rpm of the wind turbine shaft was measured by a digital tachometer. For a certain wind speed, the torque at the wind turbine shaft was calculated by a spring balance arrangement. A spring balance was attached to the shaft of the wind turbine at both sides. The tension difference on both sides when multiplied by the radius of the shaft gives the output torque. The values of the torque were calculated at various wind speeds. As the wind turbine was exposed to the cross wind, it was expected that there would be a slight difference between the experimental and simulation results. A similar model was developed in Pro/E and simulated in ADAMS. The three-blade wind turbine model was assembled with the rotor hub in Pro/E assembly mode, as shown in FIG. 1. This model was then imported to ADAMS. For various wind speeds, aerodynamic forces were calculated using MATLAB function. These forces were applied to the wind turbine model in the ADAMS environment.

Figure 6:
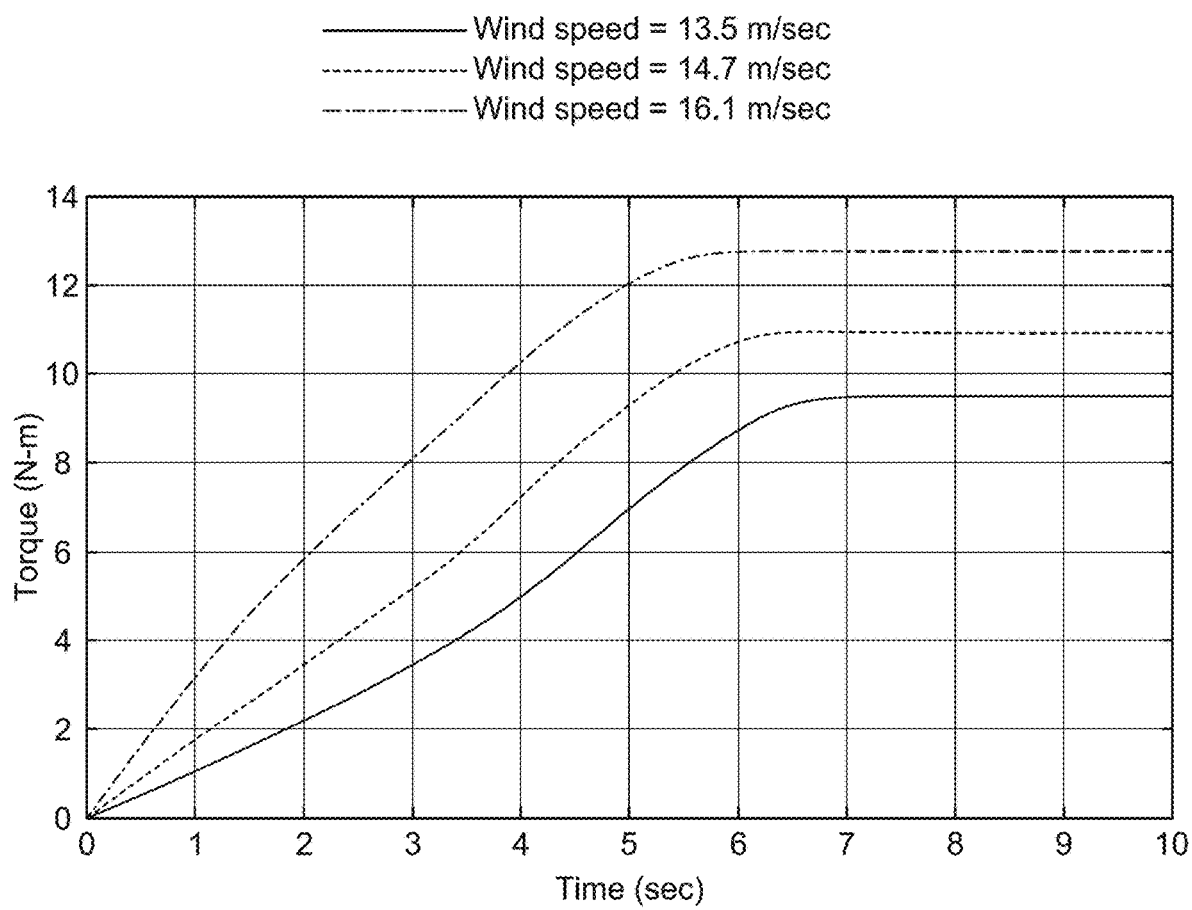
FIG. 6 shows output torque for various wind speeds, according to certain embodiments.

The output torque for various wind speeds is shown in FIG. 6. It can be seen in FIG. 6 that during the starting phase, the value of the torque is very low, and normally, it is not enough to overcome the static friction of the wind turbine 100. The starting torque is critical for the self-starting of the wind turbine 100 at low-to-medium wind speeds.

The torque output from the simulation was compared with the experimental results after 10 s. The comparison shows that the simulation results are in good agreement with the experimental results. Although there is a specific difference between the output values of torque from simulation and experiment, the difference is within a small range, which is due to the above-mentioned reason of the cross flow of the wind and the number of sections that are selected during the wind turbine blade profile development. The difference can be decreased by increasing the number of sections in the Pro/E model. The actual number of sections can be selected once the experimental values are obtained. The comparison is shown Table 1.

TABLE 1

Comparison of torque from simulation and experimental results.

| Wind speed (m/s) | Torque from simulation (N-m) | Torque from experiment (N-m) |
|---|---|---|
| 13.50 | 9.50 | 9.10 |
| 14.70 | 10.92 | 10.20 |
| 16.10 | 12.76 | 12.90 |

Figure 7A:
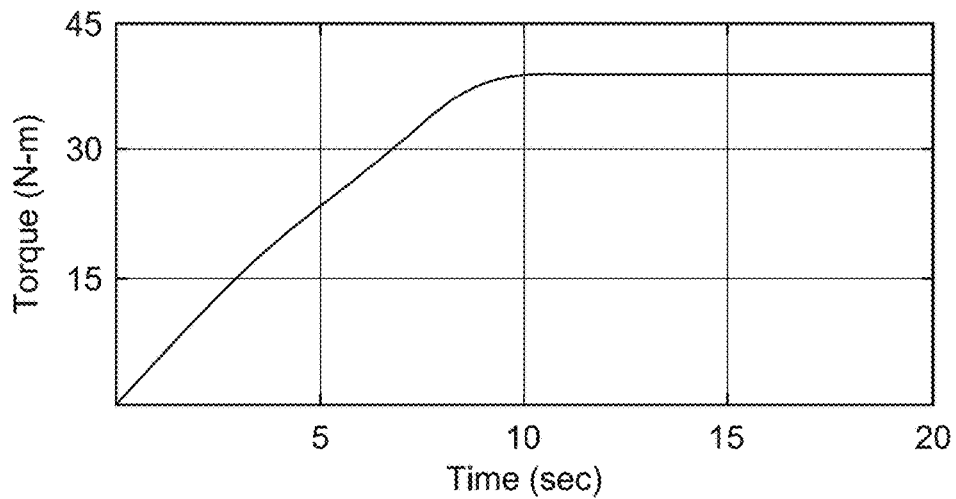
FIG. 7A shows output torque for an initial model of the blade, according to certain embodiments.

After model validation, the initial Pro/E model, shown in FIG. 1, was constructed for the Cherat region and was imported to ADAMS for the calculation of torque. The torque output is shown in FIG. 7A, and the distribution of the chord length 'CL' and the angle of twist 'γ' at twenty-seven sections of the blades 106 of the wind turbine 100 is given in Table. 2. Each column in Table 2 corresponds to a section on the blade 106.

TABLE 2

Chord length and angle of twist of an initial model of the blade.

| Section | Chord Length | Angle of twist | Section | Chord Length | Angle of twist |
|---|---|---|---|---|---|
| 1 | 0.710 | 0.394 | 15 | 0.334 | 0.044 |
| 2 | 0.658 | 0.327 | 16 | 0.321 | 0.036 |
| 3 | 0.613 | 0.275 | 17 | 0.310 | 0.029 |
| 4 | 0.574 | 0.233 | 18 | 0.299 | 0.023 |
| 5 | 0.539 | 0.110 | 19 | 0.289 | 0.017 |
| 6 | 0.508 | 0.172 | 20 | 0.280 | 0.012 |
| 7 | 0.480 | 0.148 | 21 | 0.271 | 0.007 |
| 8 | 0.455 | 0.128 | 22 | 0.263 | 0.003 |
| 9 | 0.433 | 0.111 | 23 | 0.255 | −0.001 |
| 10 | 0.413 | 0.096 | 24 | 0.248 | −0.005 |
| 11 | 0.394 | 0.083 | 25 | 0.241 | −0.009 |
| 12 | 0.377 | 0.072 | 26 | 0.235 | −0.012 |
| 13 | 0.361 | 0.061 | 27 | 0.228 | −0.015 |
| 14 | 0.347 | 0.052 | | | |

Figure 7B:
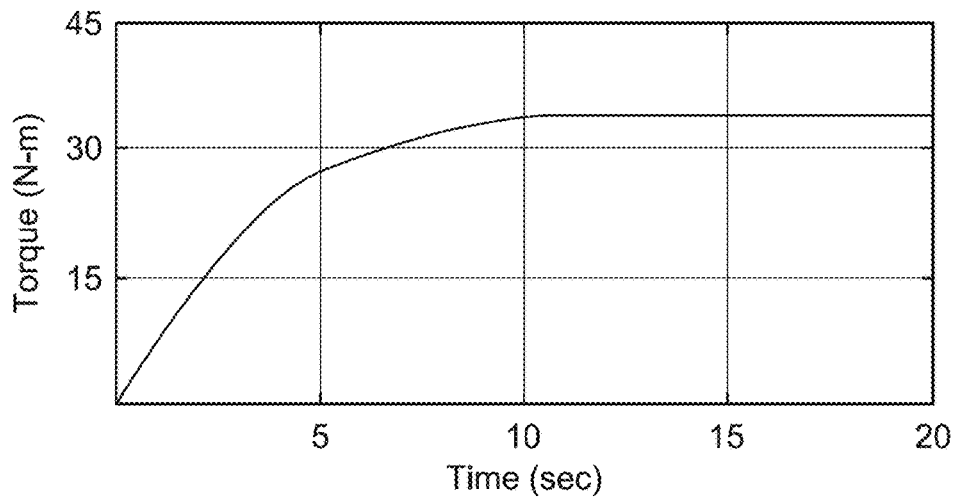
FIG. 7B shows output torque for an increased chord length model of the blade, according to certain embodiments.

Next, the Chord length 'CL' of the blades 106 of the wind turbine 100 are increased, as shown in Table. I, near the rotor hub 104 of the wind turbine 100 (in the nine sections near the rotor hub 104 of the wind turbine 100). The torque output is shown in FIG. 7B. If the magnitude of the torque, shown in FIG. 7A and FIG. 7B, is compared after 5 s, it can be observed that the starting torque is increased by increasing the Chord length 'CL'.

Figure 7C:
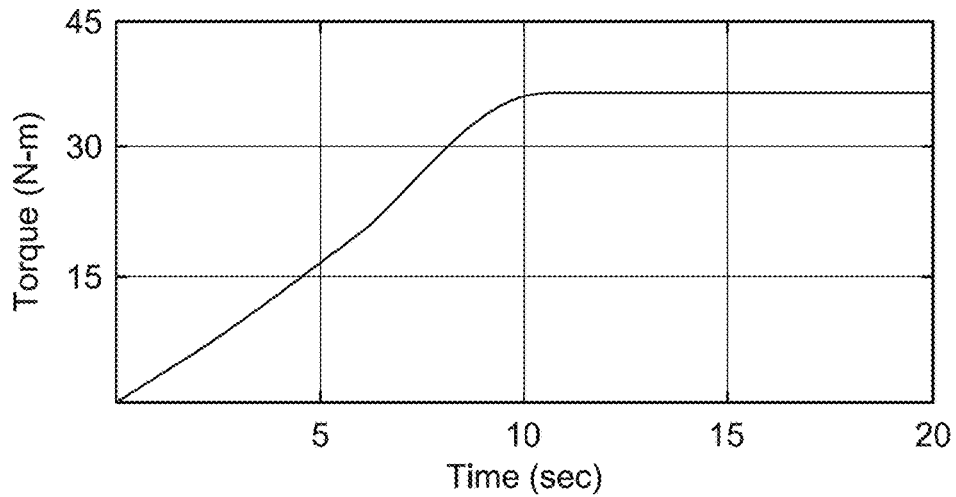
FIG. 7C shows output torque for a decreased chord length model of the blade, according to certain embodiments.

Further, the Chord length 'CL' of the blades 106 are decreased near the rotor hub 104 of the wind turbine 100 (in the nine sections near the rotor hub 104 of the wind turbine 100). The distribution of the Chord length 'CL' and the angle of twist 'γ' at twenty-seven sections of the blades 106 of the wind turbine 100 is given in Table. 3. Each column in Table 3 corresponds to the section on the blade 106. The torque output is shown in FIG. 7C. If the magnitude of the torque, shown in FIG. 7A and FIG. 7C, is compared after 5 s, it can be observed that the starting torque is decreased by decreasing the Chord length 'CL'.

TABLE 3

Chord length and angle of twist of a decreased chord length model of the blade.

| Sections | Chord Length | Angle of twist |
|---|---|---|
| 1 | 0.679 | 0.394 |
| 2 | 0.630 | 0.327 |
| 3 | 0.587 | 0.275 |
| 4 | 0.549 | 0.233 |
| 5 | 0.520 | 0.110 |
| 6 | 0.486 | 0.172 |
| 7 | 0.460 | 0.148 |
| 8 | 0.44 | 0.128 |
| 9 | 0.414 | 0.111 |
| 10 | 0.413 | 0.096 |
| 11 | 0.394 | 0.083 |
| 12 | 0.377 | 0.072 |
| 13 | 0.361 | 0.061 |
| 14 | 0.347 | 0.052 |
| 15 | 0.334 | 0.044 |
| 16 | 0.321 | 0.036 |
| 17 | 0.310 | 0.029 |
| 18 | 0.299 | 0.023 |
| 19 | 0.289 | 0.017 |
| 20 | 0.280 | 0.012 |
| 21 | 0.271 | 0.007 |
| 22 | 0.263 | 0.003 |
| 23 | 0.255 | −0.001 |
| 24 | 0.248 | −0.005 |
| 25 | 0.241 | −0.009 |
| 26 | 0.235 | −0.012 |
| 27 | 0.228 | −0.015 |

Figure 7D:
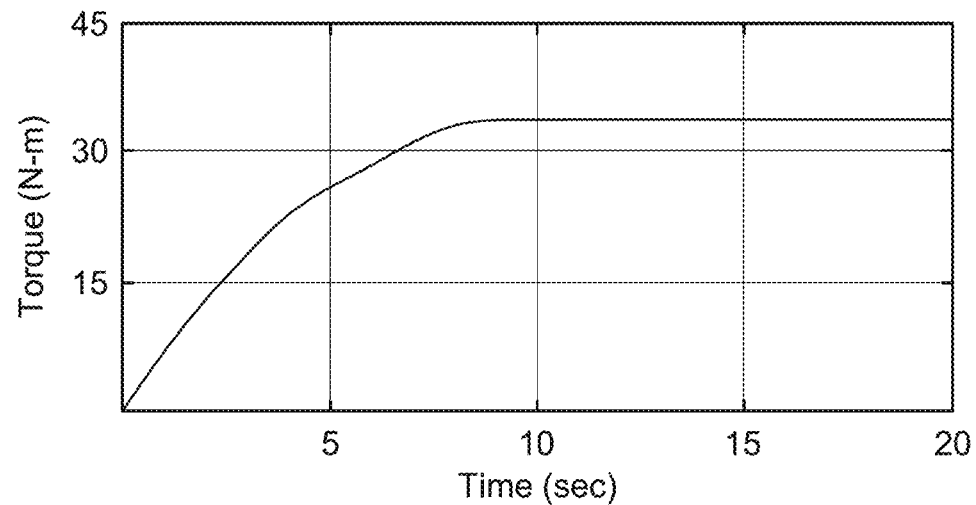
FIG. 7D shows output torque for an increased angle of twist model of the blade, according to certain embodiments.

In the next case, the angle of twist 'γ' of the blades 106 are increased, as shown in Table. II, near the rotor hub 104 of the wind turbine 100 (in the nine sections near the rotor hub 104 of the wind turbine 100). The torque output is shown in FIG. 7D. If the magnitude of the torque, shown in FIG. 7A and FIG. 7D, is compared after 5 s, it can be observed that the starting torque is increased by increasing the angle of twist 'γ'.

Figure 7E:
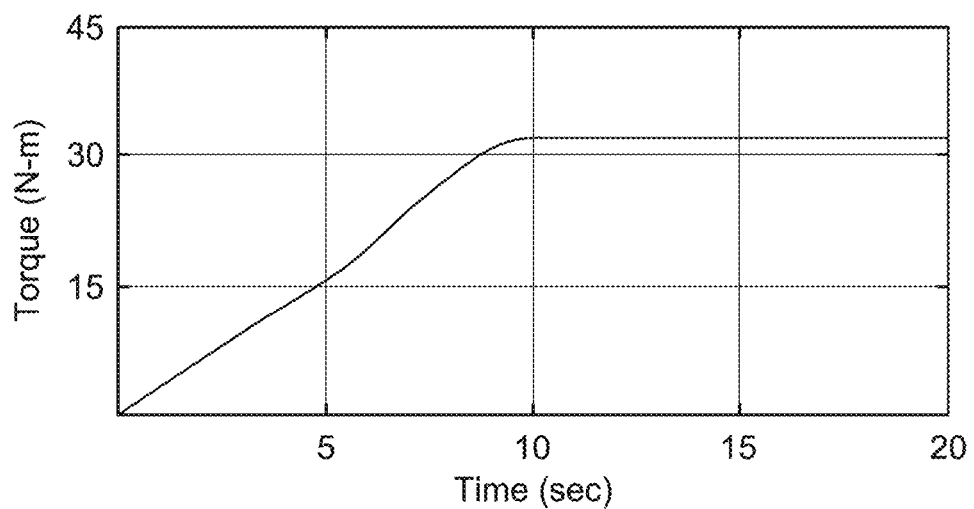
FIG. 7E shows output torque for a decreased angle of twist model of the blade, according to certain embodiments.
Figure 8A:
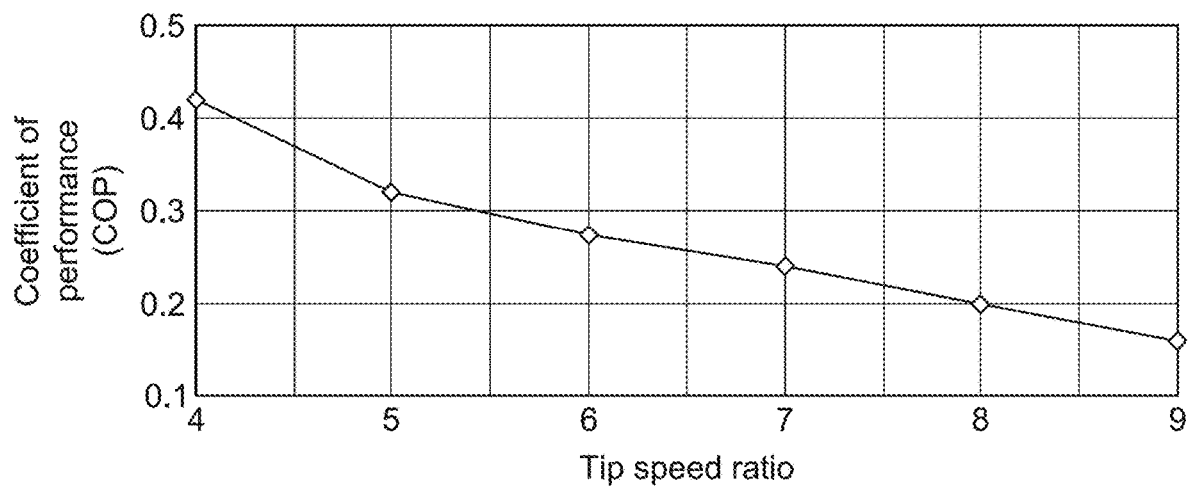
FIG. 8A shows coefficient of performance (COP) for the initial model of the blade, according to certain embodiments.
Figure 8B:
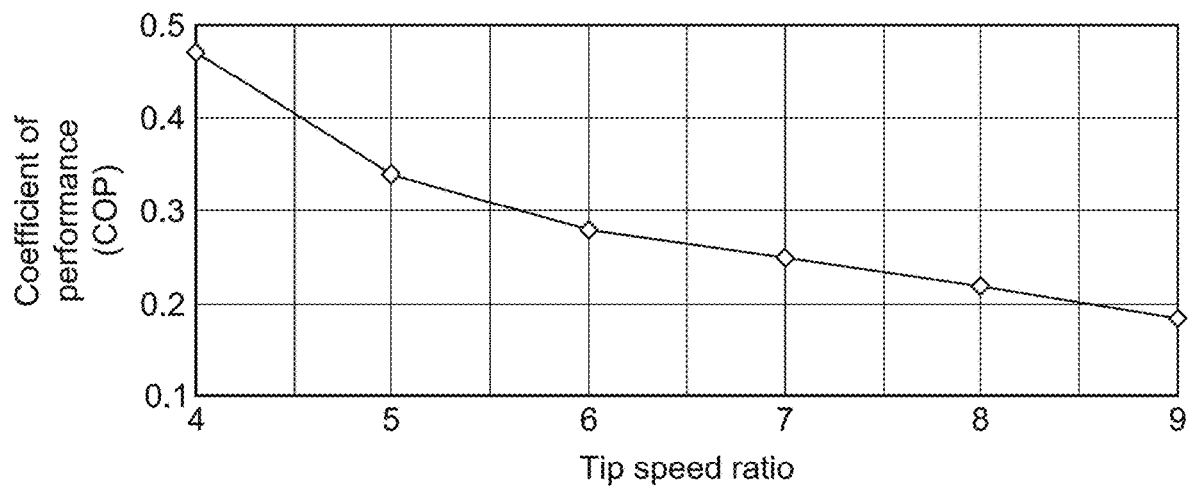
FIG. 8B shows COP for the increased chord length model of the blade, according to certain embodiments.
Figure 8C:
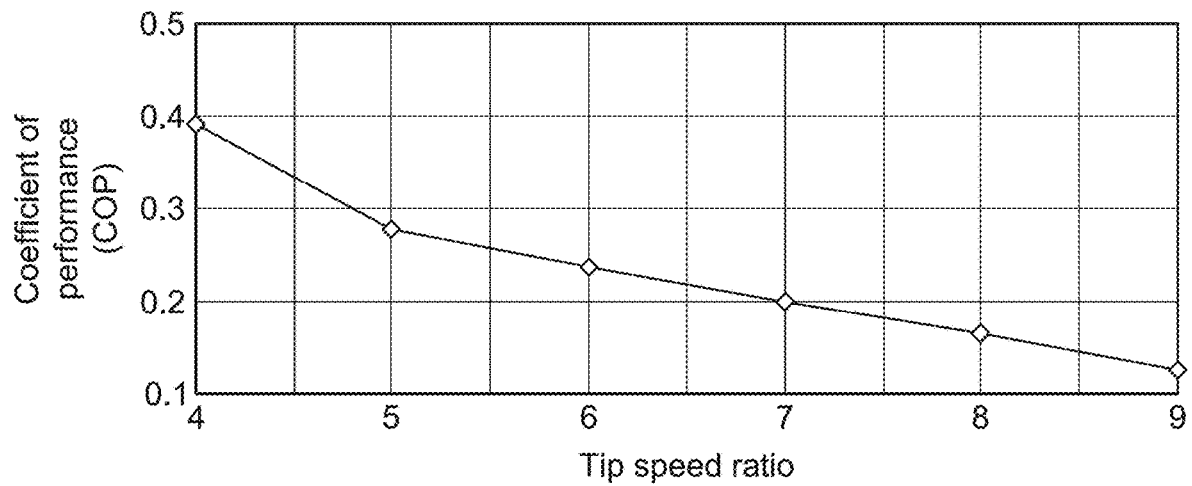
FIG. 8C shows COP for the decreased chord length model of the blade, according to certain embodiments.
Figure 8D:
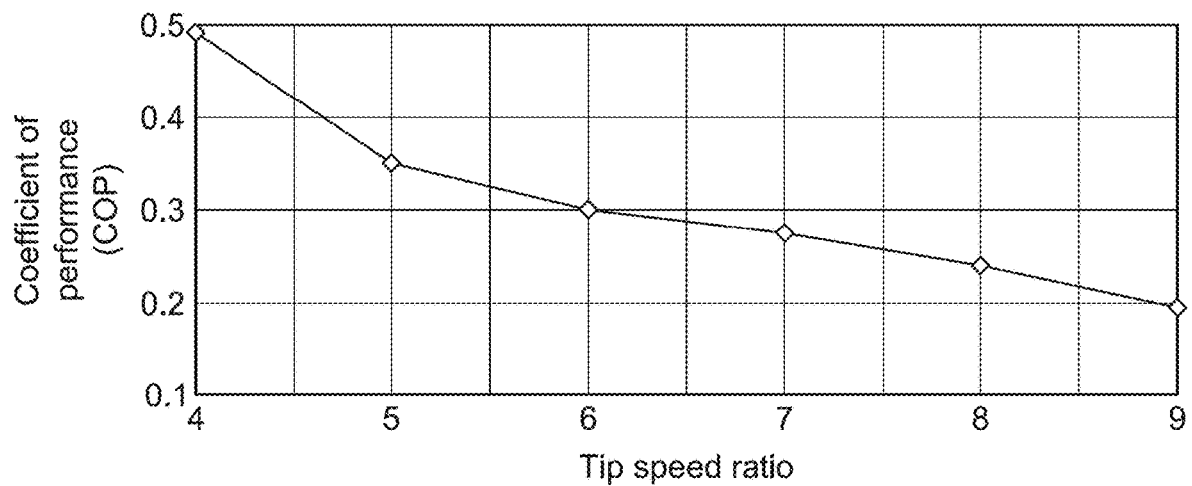
FIG. 8D shows COP for the increased angle of twist model of the blade, according to certain embodiments.
Figure 8E:
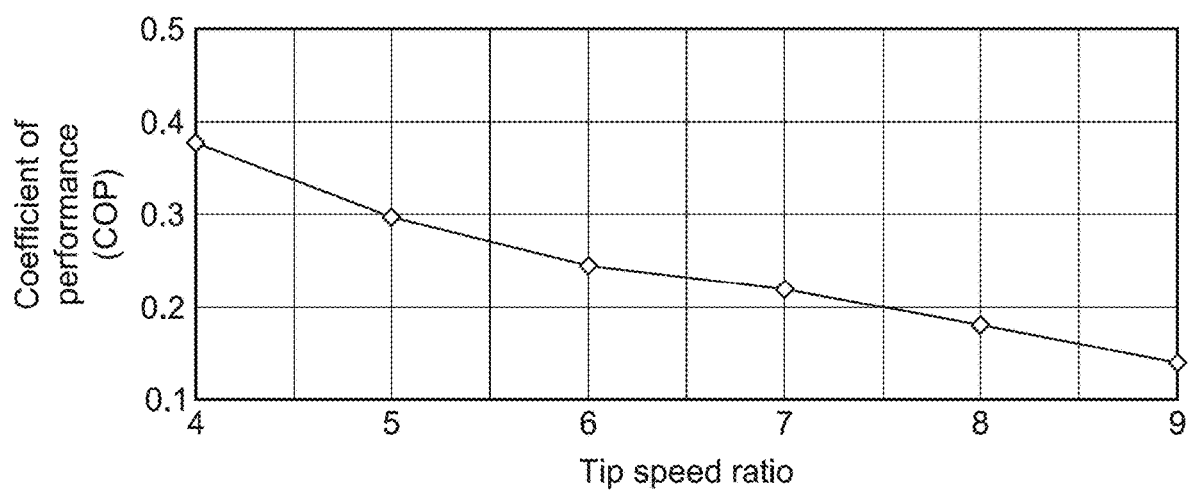
FIG. 8E shows COP for the decreased angle of twist model of the blade, according to certain embodiments.

In the last case, the angle of twist 'γ' of the blades 106 are decreased near the rotor hub 104 of the wind turbine 100 (in the nine sections near the rotor hub 104 of the wind turbine 100). The distribution of the Chord length 'CL' and the angle of twist 'γ' at twenty-seven sections of the blades 106 of the wind turbine 100 is given in Table. 4. Each column in Table 4 corresponds to the section on the blade 106. The torque output is shown in FIG. 7E. If the magnitude of the torque, shown in FIG. 7A and FIG. 7E, is compared after 5 s, it can be observed that the starting torque is decreased by decreasing the angle of twist 'γ'.

TABLE 4

Chord length and angle of twist of a decreased angle of twist model of the blade.

| Sections | Chord Length | Angle of twist |
|---|---|---|
| 1 | 0.710 | 0.341 |
| 2 | 0.658 | 0.275 |
| 3 | 0.613 | 0.222 |
| 4 | 0.574 | 0.181 |
| 5 | 0.539 | 0.147 |
| 6 | 0.508 | 0.119 |
| 7 | 0.480 | 0.096 |
| 8 | 0.455 | 0.076 |
| 9 | 0.433 | 0.059 |
| 10 | 0.413 | 0.096 |
| 11 | 0.394 | 0.083 |
| 12 | 0.377 | 0.072 |
| 13 | 0.361 | 0.061 |
| 14 | 0.347 | 0.052 |
| 15 | 0.334 | 0.044 |
| 16 | 0.321 | 0.036 |
| 17 | 0.310 | 0.029 |
| 18 | 0.299 | 0.023 |
| 19 | 0.289 | 0.017 |
| 20 | 0.280 | 0.012 |
| 21 | 0.271 | 0.007 |
| 22 | 0.263 | 0.003 |
| 23 | 0.255 | −0.001 |
| 24 | 0.248 | −0.005 |
| 25 | 0.241 | −0.009 |
| 26 | 0.235 | −0.012 |
| 27 | 0.228 | −0.015 |

The methodology followed in the present disclosure for increasing the initial torque by the alteration of the part of the blades 106 near the rotor hub 104 is a very efficient and easily implemented strategy compared to other strategies based on changing the number of blades 106 or using various mechanisms for blade pitching. In FIG. 7A through FIG. 7E, it is also confirmed that the starting of the wind turbine 100 is mainly dependent on the blade profile near the rotor hub region because the alteration of the blade parameters near the rotor hub 104 of the wind turbine 100 has caused excessive variations in the magnitude of the starting torque. In an embodiment of the present disclosure, as shown in FIG. 7A through FIG. 7E, a torque curve, which is alternatively referred to as the torque-magnitude-profile-over-time, includes a slope which logarithmically increases over time during the first 10 seconds of rotation. In other words, the slope of the torque curve increases with the increase in the values of the angle of twist 'γ' and the Chord length 'CL' near the rotor hub 104 of the wind turbine 100. With this rapid increase in the magnitude of the torque during the initial period of 10 seconds, the starting behavior of the wind turbine 100 is improved.

The COP of the above-mentioned cases is shown in FIG. 8A through FIG. 8E. The COP shows the amount of kinetic energy extracted by the wind turbine 100 from the incoming wind. Based on the equations (17) and (18), the COP of the wind turbine 100 is dependent on the tip speed ratio, tip losses, the coefficient of lift, the coefficient of drag and the relative flow angle onto the blade 106. The COP is a very important factor during the wind turbine design because, based on the equation (19), the actual power generated by the wind turbine 100 is mainly dependent on the value of the COP for the wind turbine 100.

It can be seen from FIGS. 8A-8E that the COP of the wind turbine 100 decreases by decreasing the chord length 'CL' and angle of twist 'γ' near the rotor hub 104 of the wind turbine 100 (in the nine sections near the rotor hub 104 of the wind turbine 100). The COP increases by increasing the chord length 'CL' and the angle of twist 'γ' near the rotor hub 104 of the wind turbine 100 (in the nine sections near the rotor hub 104 of the wind turbine 100). Based on the results shown in FIGS. 7A-7E and FIGS. 8A-8E, the blade parameters corresponding to the increasing Chord length 'CL' and angle of twist 'γ' will give a maximum starting torque and COP.

According to the present disclosure, the design modelling is performed using the Pro/E, ADAMS and MATLAB software applications for improving the starting behavior of the small horizontal axis wind turbine. During the modeling process, the effects of changing the wind turbine blade parameters such as the Chord length 'CL' and the angle of twist 'γ' near the rotor hub 104 of the wind turbine 100 on the starting torque of the wind turbine 100 are evaluated. The BEM theory is used to calculate the wind turbine blade parameters that correspond to the maximum starting torque. Different blade profiles were developed from the initial wind turbine blade profile by varying the Chord length 'CL' and the angle of twist 'γ'. Increasing the Chord length 'CL' and the angle of twist 'γ' near the hub region increases the output starting torque. If the magnitude of the starting torque is compared after 5 s for the various blade profiles, it is observed that increasing the angle of twist 'γ' and the Chord length 'CL' near the rotor hub 104 of the wind turbine 100 will increase the magnitude of the starting torque. Based on the wind turbine blade parameters, Pro/E models were developed and imported to ADAMS software to calculate the torque. As compared to the initial wind turbine model, for the wind turbine model, the starting torque is increased from 22.5 N-m to 28 N-m and the coefficient of performance (COP) is increased from 0.42 to 0.49 at the tip speed ratio of 4. The slope of the torque curve increases with the increase in the values of the angle of twist 'γ' and the Chord length 'CL' near the rotor hub 104 of the wind turbine 100. With this rapid increase in the magnitude of the torque during the initial period, the starting behavior of the wind turbine 100 is improved. As such, the starting behavior of the horizontal axis wind turbine 100 was successfully improved, and the wind turbine model shows an increased starting torque for low-to-medium wind speed ranges.

Numerous modifications and variations of the present disclosure are possible in light of the above teachings. It is therefore to be understood that within the scope of the appended claims, the invention may be practiced otherwise than as specifically described herein.

TABLE 5

| Sections | Chord length | Angle of twist |
|---|---|---|
| 1 | 0.981 | 0.394 |
| 2 | 0.910 | 0.327 |
| 3 | 0.847 | 0.275 |
| 4 | 0.792 | 0.233 |
| 5 | 0.744 | 0.110 |
| 6 | 0.702 | 0.172 |
| 7 | 0.663 | 0.148 |
| 8 | 0.629 | 0.128 |
| 9 | 0.598 | 0.111 |
| 10 | 0.413 | 0.096 |
| 11 | 0.394 | 0.083 |
| 12 | 0.377 | 0.072 |
| 13 | 0.361 | 0.061 |
| 14 | 0.347 | 0.052 |
| 15 | 0.334 | 0.044 |
| 16 | 0.321 | 0.036 |
| 17 | 0.310 | 0.029 |
| 18 | 0.299 | 0.023 |
| 19 | 0.289 | 0.017 |
| 20 | 0.280 | 0.012 |
| 21 | 0.271 | 0.007 |
| 22 | 0.263 | 0.003 |
| 23 | 0.255 | −0.001 |
| 24 | 0.248 | −0.005 |
| 25 | 0.241 | −0.009 |
| 26 | 0.235 | −0.012 |
| 27 | 0.228 | −0.015 |

TABLE 6

| Sections | Chord length | Angle of twist |
|---|---|---|
| 1 | 0.710 | 0.446 |
| 2 | 0.658 | 0.380 |
| 3 | 0.613 | 0.327 |
| 4 | 0.574 | 0.286 |
| 5 | 0.539 | 0.252 |
| 6 | 0.508 | 0.224 |
| 7 | 0.480 | 0.201 |
| 8 | 0.455 | 0.181 |
| 9 | 0.433 | 0.164 |
| 10 | 0.413 | 0.096 |
| 11 | 0.394 | 0.083 |
| 12 | 0.377 | 0.072 |
| 13 | 0.361 | 0.061 |
| 14 | 0.347 | 0.052 |
| 15 | 0.334 | 0.044 |
| 16 | 0.321 | 0.036 |
| 17 | 0.310 | 0.029 |
| 18 | 0.299 | 0.023 |
| 19 | 0.289 | 0.017 |
| 20 | 0.280 | 0.012 |
| 21 | 0.271 | 0.007 |
| 22 | 0.263 | 0.003 |
| 23 | 0.255 | −0.001 |
| 24 | 0.248 | −0.005 |
| 25 | 0.241 | −0.009 |
| 26 | 0.235 | −0.012 |
| 27 | 0.228 | −0.015 |

The invention claimed is:

1. A wind turbine for a region with a yearly average wind speed of less than 5 m/s, comprising:
   a rotor comprising a rotor hub wherein the rotor has a rotor diameter and is configured for rotation with a starting torque and a torque-magnitude-profile-over-time; and
   a plurality of blades wherein each blade of the plurality of blades:
   is connected to the rotor hub;
   extends radially about the rotor hub;
   has a blade root and a blade tip; and
   has a plurality of sections distributed longitudinally between the blade root and the blade tip, wherein each section of the plurality of sections has a chord length and an angle of twist set forth in Table 5;
   wherein the plurality of blades includes three or more blades;
   wherein the chord length is a first non-dimensional value from 0 to 1 and the angle of twist is specified in radian; and
   wherein the first non-dimensional value is convertible to a dimensional value in meters by multiplying the first non-dimensional value of the chord length.

2. The wind turbine of claim 1, wherein the rotor diameter is about 5 meters.

3. The wind turbine of claim 2, wherein the region with the yearly average wind speed of less than 5 m/s has the yearly average wind speed of about 3.56 m/s.

4. The wind turbine of claim 3, wherein the starting torque of the rotor is greater than 25 N-m.

5. The wind turbine of claim 1, wherein the torque-magnitude-profile-over-time of the rotor includes a slope, wherein the slope logarithmically increases over time during a first 10 seconds of rotation.

6. The wind turbine of claim 1, wherein the maximum chord length is about 1.1 m.

7. A wind turbine for a region with a yearly average wind speed of less than 5 m/s, comprising:
- a rotor comprising a rotor hub wherein the rotor has a rotor diameter and is configured for rotation with a starting torque and a torque-magnitude-profile-over-time; and
- a plurality of blades wherein each blade of the plurality of blades:
- is connected to the rotor hub;
- extends radially about the rotor hub;
- has a blade root and a blade tip; and
- has a plurality of sections distributed longitudinally between the blade root and the blade tip, wherein each section of the plurality of sections has a chord length and an angle of twist set forth in Table 6;
- wherein the plurality of blades includes three or more blades;
- wherein the chord length is a first non-dimensional value from 0 to 1 and the angle of twist is specified in radian; and
- wherein the first non-dimensional value is convertible to a dimensional value in meters by multiplying the first non-dimensional value of the chord length.

8. The wind turbine of claim 7, wherein the rotor diameter is about 5 meters.

9. The wind turbine of claim 8, wherein the region with the yearly average wind speed of less than 5 m/s has the yearly average wind speed of about 3.56 m/s.

10. The wind turbine of claim 9, wherein the starting torque is greater than 25 N-m.

11. The wind turbine of claim 7, wherein the torque-magnitude-profile-over-time includes a slope, wherein the slope logarithmically increases over time during a first 10 seconds of rotation.

12. The wind turbine of claim 7, wherein the maximum chord length is about 1.1 m.

\* \* \* \* \*